United States Patent [19]

Basterfield et al.

[11] 4,411,372
[45] Oct. 25, 1983

[54] PRESSURE VESSEL CONSTRUCTION

[75] Inventors: Ernest P. Basterfield; Parker L. Basterfield, both of Johannesburg, South Africa

[73] Assignee: Chern Developments Limited, Transvaal, South Africa

[21] Appl. No.: 326,666

[22] Filed: Dec. 3, 1981

[30] Foreign Application Priority Data

Dec. 4, 1980 [ZA] South Africa ............ 80/7573

[51] Int. Cl.³ ............................ B65D 45/00
[52] U.S. Cl. .................... 220/327; 220/328; 220/378
[58] Field of Search ............ 220/327, 328, 378

[56] References Cited

U.S. PATENT DOCUMENTS 2,793,787 5/1957 Lescure .............. 220/327 X
3,187,929 6/1965 Shaw, Jr. ............ 220/378 X Primary Examiner—George T. Hall
Attorney, Agent, or Firm—Brumbaugh, Graves, Donohue & Raymond

[57] ABSTRACT

A lid for a pressure vessel which is seamless and which includes a peripheral groove in an outer surface formed by deforming the material of the lid, for example by a swaging process. The groove accommodates a seal, such as an O-ring.

3 Claims, 7 Drawing Figures

U.S. Patent  Oct. 25, 1983  Sheet 1 of 2  4,411,372
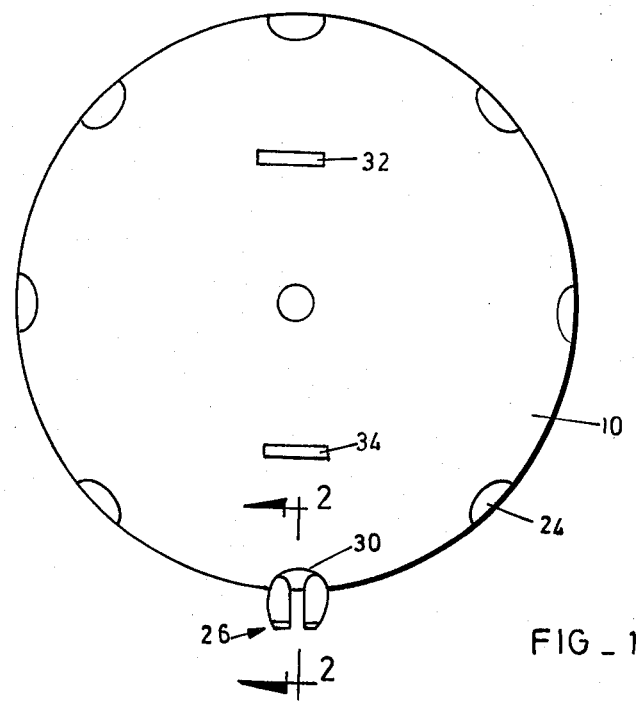
FIG_1
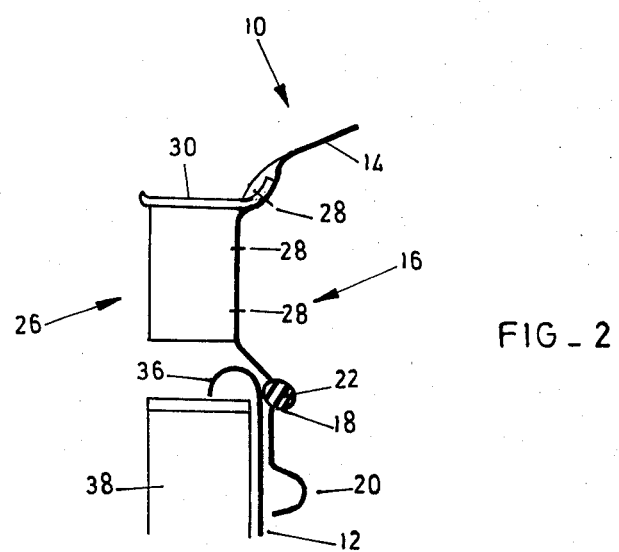
FIG_2

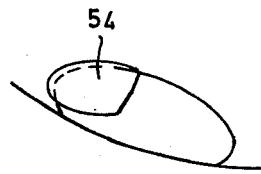
FIG_3a
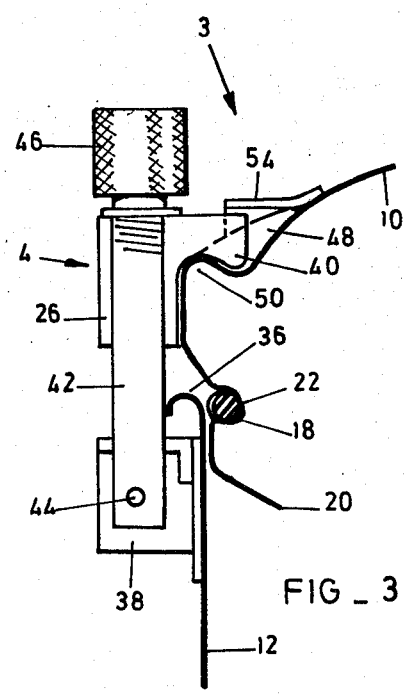
FIG_3
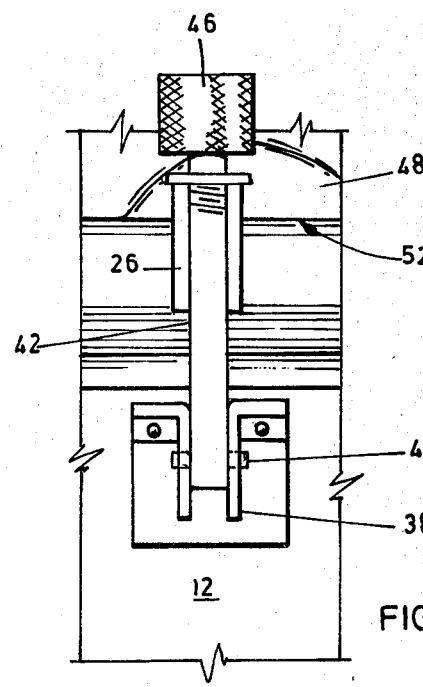
FIG_4
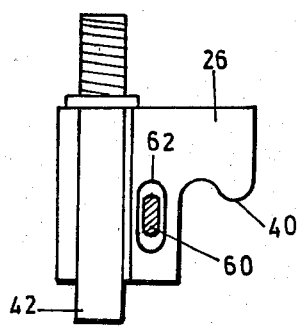
FIG_5
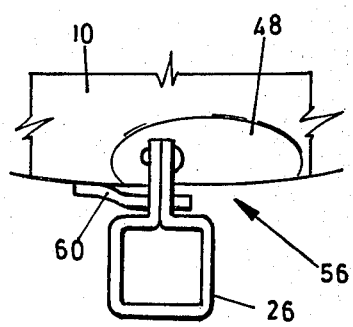
FIG_6

PRESSURE VESSEL CONSTRUCTION

BACKGROUND OF THE INVENTION

This invention relates to a pressure vessel.

The applicant has previously developed a stainless steel pressure vessel with a lid formed by welding a domed section to a tapered lid band. A groove is machined in the band and an O-ring is located in the groove to provide a seal with the wall of a container. This construction carries with it the disadvantage that the band is unnecessarily thick, for it has to accommodate the depth of the machined groove. Thus the lid is heavy, and because it is fabricated from stainless steel, it is expensive. The welding operation to join the two components together calls for skilled labour and simultaneously introduces a seam which is prone to collect foreign material.

SUMMARY OF THE INVENTION

It is an object of the present invention to provide a pressure vessel lid of improved construction.

The invention provides a seamless lid for a pressure vessel which includes a peripheral groove in an outer surface formed by deforming the material of the lid, which groove in use receives sealing means.

The sealing means may be an O-ring.

The groove may be formed by a swaging operation.

The invention also extends to a combination of a lid, as described, and a container to which are secured a plurality of fastening fixtures, each fastening fixture including a threaded shaft which is secured to the container and which is pivotal in a substantially vertical plane, a bracket with a hook formation which is movable along at least part of the shaft and which is engageable with a complemental formation on the lid, and a nut which is threadedly engaged with the shaft and which is rotatable to a position at which it prevents disengagement of the bracket from the lid.

In one form of the invention the lid includes a plurality of plates, each of which corresponds to one of the fastening fixtures, the lid and the container being relatively rotatable, when the brackets are engaged with the respective complemental formations on the lid, between a first position at which each bracket is movable along its respective shaft without contacting a plate, and a second position at which each plate overlies at least part of a corresponding bracket, thereby preventing disengagement of the bracket from the lid by movement of the bracket along the shaft.

In another form of the invention the lid includes a plurality of members, each of which corresponds to one of the fastening fixtures, the members being engageable with complemental formations on the respective brackets, by relative rotation of the lid and container, thereby limiting movement of the brackets along their respective shafts.

The rim of the lid may be turned inwardly so as to form a strengthening or stiffening flange.

BRIEF DESCRIPTION OF THE DRAWINGS

The invention is further described by way of examples with reference to the accompanying drawings in which:

FIG. 1 is a plan view of a lid according to the invention,

FIG. 2 is a fragmentary cross sectional view of the lid taken on the line 2—2 of FIG. 1 and on an enlarged scale.

FIG. 3 is a view similar to FIG. 2 of a different lid according to the invention, FIG. 3a is a plan view of portion of the lid of FIG. 3 in the direction of an arrow "3", FIG. 4 is a side view of part of the lid of FIG. 3 in the direction of an arrow "4", FIG. 5 is a side view of a bracket used in another form of the invention, and FIG. 6 is a plan view of the bracket of FIG. 5.

DESCRIPTION OF PREFERRED EMBODIMENT

FIGS. 1 and 2 illustrate a stainless steel lid 10 which is engageable with a stainless steel container 12 to form a pressure vessel.

The lid 10 is formed from a single piece of steel and so is seamless. The lid has a dome 14 formed by a pressing operation and a profiled waist 16 formed subsequently by pressing and the use of a suitable two part die.

A groove 18 is then formed peripherally in the outer surface of the waist 16, and the edge of the rim of the lid is turned inwardly to provide a stiffening flange 20, both operations being performed by a swaging process.

The groove 18, in use of the lid, accommodates an O-ring seal 22.

In the pressing operation the lid 10 is formed with eight recesses 24 in its upper surface. Brackets 26 are attached to the lid by spot welding at locations 28. Each bracket has a web 30 which extends upwardly on the dome 14 into the associated recess.

This construction has the advantage that the brackets may be welded to the lid semi-automatically i.e., by spot welding and, as the brackets are welded to the waist and the upper surface of the lid, any tendency of the brackets to rotate under stress during use of the vessel is prevented.

The lid 10 has two spaced handles 32, 34 respectively, on its upper surface. Since the handles are off-centre they offer relatively greater leverage than a single handle located in the centre of the lid.

The container 12 has a rim 36 which is smoothly turned over through 180° to provide a continuous highly effective strengthening flange. Brackets 38 below this rim carry fastening fixtures (not shown) which are used to secure the lid to the container.

The principal advantage of the present invention lies in the unitary or integral construction of the lid 10 which eliminates welding seams and the like. By deformation of the lid material an appropriate groove is formed to receive the O-ring seal which in use offers a highly effective seal against the inner wall of the container.

Since the step of machining the groove in the lid is eliminated, the lid can be made of material of a thinner gauge, which is less expensive and lighter, and with a considerable labour saving. The result is a lid superior in performance, characteristics and price.

The brackets shown in FIG. 2 can be modified, as shown in FIGS. 3 and 4, to reduce the welding operations on the lid. In these Figures like reference numerals to those of FIGS. 1 and 2 are used to designate like components.

Each of the brackets 26 is formed with a hook formation 40 and is supported on a square shaft 42 pivotally engaged with a pin 44 which passes through the bracket 38 which is spot welded to the container 12. A nut 46 is engaged with the threaded upper end of the shaft. The square section of the shaft 42 is so designed as to prevent the hook formation 40 from pivoting and thereby disengaging from the lid.

The lid 10 is formed at each of a plurality of spaced locations 52 with an upwardly facing recess 48 of the same profile as the hook formation 40 and the rim 50 of each recess is deformed, to reduce its height, as shown in FIG. 4.

Outwardly extending plates 54 are welded to the lid 10 projecting over the recesses 48.

This modified arrangement retains all the advantages already outlined. When the lid is placed on the container the brackets are aligned with the locations 52. The brackets and the shafts are then rotated upwardly in vertical planes so that the hook shaped formations 40 pass over the lowered rims 50 and are in register with the recesses 48.

The lid is rotated relatively to the container and the plates 54 are moved thereby to positions at which they extend partly over the brackets, as shown in FIG. 3.

The nuts 46 may then be tightened to provide a pressure tight lid/container seal.

The lid may only be removed if the nuts are slackened. If this is done the lid may move away from the container to a limited extent to permit excess pressure to blow off. However the lid cannot be detached as the brackets cannot be swung out of engagement with the recesses 48. The brackets cannot be raised when the nuts are slackened because of the plates 54. However, if the lid is rotated the brackets are free of the plates and in addition are moved to the positions at which the rims 50 are lowered. Thus the brackets may easily be swung out of engagement with the lid.

FIGS. 5 and 6 illustrate another variation of a bracket used in the invention. Again like numerals denote like components. The plates 54 are dispensed with and replaced by rod like members 60 welded to the outer wall of the lid 10. The brackets 26 are formed with elongate holes 62. Once the brackets are moved into position over the recesses 48 the holes 62 are aligned with the rods 60. Thus, when the lid 10 is rotated in the appropriate direction, the rods enter the holes. As the holes are elongate the lid can move to a limited extent and so can be securely fixed to the containers as the nuts 46 are tightened.

If the nuts are slackened excess pressure can blow off, without danger of the lid being blown off, because of the limited lid movement permitted by the interengaging holes 62 and rods 60. However, when the nuts 46 are slackened the lid may be rotated so that the rods 60 are retracted from the holes 62 and the brackets 26 may then be swung out of engagement with the lid to permit its removal.

We claim:

1. A pressure vessel comprising a container; a seamless lid including a peripheral groove formed in an outer surface thereof by deforming the material of said lid; sealing means located at least partly in said peripheral groove; and a plurality of fastening fixtures, wherein each of said fastening fixtures comprises a threaded shaft which is secured to said container and pivotal relative thereto in a substantially vertical plane, a bracket having a hook formation and which is movable along at least a part of said shaft, and which is engageable in a complemental formation on said lid, and a nut which threadedly engages said shaft and is rotatable between a position at which it prevents disengagement and a position at which it permits engagement of said bracket and said lid.

2. A pressure vessel according to claim 1 wherein the lid includes a plurality of plates, each of which corresponds to one of the fastening fixtures, the lid and the container being relatively rotatable, when the brackets are engaged with the respective complemental formations on the lid, between a first position at which each bracket is movable along its respective shaft without contacting a plate, and a second position at which each plate overlies at least part of a corresponding bracket, thereby preventing disengagement of the bracket from the lid by movement of the bracket along the shaft.

3. A pressure vessel according to claim 1 wherein the lid includes a plurality of members, each of which corresponds to one of the fastening fixtures, the members being engageable with complemental formations on the respective brackets, by relative rotation of the lid and container, thereby limiting movement of the brackets along their respective shafts.

* * * * *

UNITED STATES PATENT AND TRADEMARK OFFICE
CERTIFICATE OF CORRECTION

PATENT NO. : 4,411,372
DATED : October 25, 1983
INVENTOR(S) : Ernest P. Basterfield et al.

It is certified that error appears in the above—identified patent and that said Letters Patent is hereby corrected as shown below:

<u>First page, Item 73</u>, after "Developments" insert --(Proprietary)--.

Signed and Sealed this

Twentieth Day of March 1984

[SEAL]

Attest:

GERALD J. MOSSINGHOFF

Attesting Officer

Commissioner of Patents and Trademarks